US010141822B2

(12) United States Patent
Ricci et al.

(10) Patent No.: US 10,141,822 B2
(45) Date of Patent: Nov. 27, 2018

(54) AXIAL FLUX BRUSHLESS PERMANENT MAGNET ELECTRICAL MACHINE ROTOR

(71) Applicant: LAUNCHPOINT TECHNOLOGIES, INC., Goleta, CA (US)

(72) Inventors: Michael Richard Ricci, Camarillo, CA (US); Jonathan Gordon Sugar, Ventura, CA (US); Bradley Evan Paden, Goleta, CA (US); David Brian Paden, Goleta, CA (US)

(73) Assignee: LAUNCHPOINT TECHNOLOGIES, INC., Goleta, CA (US)

( * ) Notice: Subject to any disclaimer, the term of this patent is extended or adjusted under 35 U.S.C. 154(b) by 246 days.

(21) Appl. No.: 15/146,143

(22) Filed: May 4, 2016

(65) Prior Publication Data

US 2016/0329795 A1  Nov. 10, 2016

Related U.S. Application Data

(60) Provisional application No. 62/156,556, filed on May 4, 2015.

(51) Int. Cl.
| | |
|---|---|
| *H02K 1/22* | (2006.01) |
| *H02K 21/24* | (2006.01) |
| *H02K 1/30* | (2006.01) |
| *H02K 1/27* | (2006.01) |

(52) U.S. Cl.
CPC ........... *H02K 21/24* (2013.01); *H02K 1/2793* (2013.01); *H02K 1/30* (2013.01)

(58) Field of Classification Search
CPC ......... H02K 21/24; H02K 1/30; H02K 1/2793
USPC ................................ 310/268, 156.01–156.84
See application file for complete search history.

(56) References Cited

U.S. PATENT DOCUMENTS

| | | | |
|---|---|---|---|
| 4,638,200 A | 1/1987 | Le Corre et al. | |
| 4,996,457 A | 2/1991 | Hawsey et al. | |
| 5,705,902 A | 1/1998 | Merritt et al. | |
| 6,047,461 A | 4/2000 | Miura et al. | |
| 6,664,880 B2 | 12/2003 | Post | |
| 6,841,910 B2 | 1/2005 | Gery | |
| 7,737,594 B2 | 6/2010 | Abe et al. | |
| 7,990,011 B2 | 8/2011 | Yoshino et al. | |
| 8,598,761 B2 | 12/2013 | Langford et al. | |
| 8,994,239 B2 | 3/2015 | Peng et al. | |
| 2010/0231079 A1* | 9/2010 | Abe ..................... | H02K 1/2793 310/156.35 |

(Continued)

OTHER PUBLICATIONS

Lovatt et al., "Design of an In-Wheel Motor for a Solar-Powered Electric Vehicle", IEE Proc. Electrical Machines and Drives, No. 444, 1997, 5 pages.

(Continued)

*Primary Examiner* — Hanh Nguyen
(74) *Attorney, Agent, or Firm* — Leber IP Law; Dennis R. Haszko

(57) ABSTRACT

An axial flux brushless permanent magnet electrical machine having a stator and at least one rotor. The rotor includes a Halbach array of magnets with at least four magnets per magnetic cycle. The rotor magnets are contained within pockets in the rotor. The pockets are formed with magnet pocket walls being radial walls, active surface walls, and/or inactive surface walls where the walls retain the magnets within the pockets.

5 Claims, 18 Drawing Sheets

(56) References Cited

U.S. PATENT DOCUMENTS

2011/0273034 A1* 11/2011 Yamamoto ........... H02K 1/2793
310/44

OTHER PUBLICATIONS

El-Hasan, "Manufacturing and Assembly Processes of High Speed Axial Flux Permanent Magnet Rotor Prototype," Proceedings of the 9th International Conference on Energy and Environment (EE'14), Geneva, Switzerland, Dec. 29-31, 2014, pp. 38-45, ISBN: 978-1-61804-265-1.

* cited by examiner

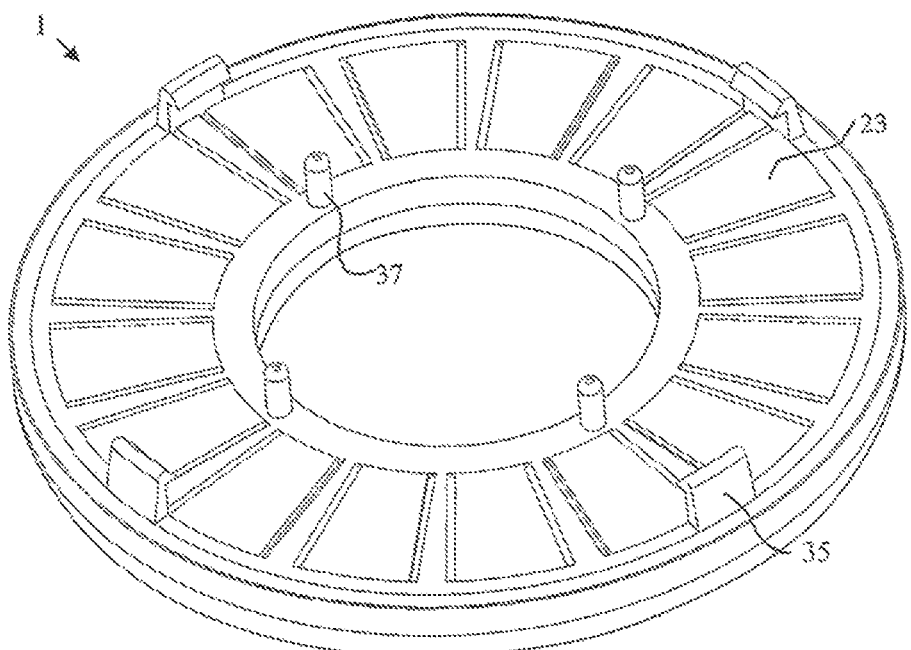
(Prior Art) Fig. 2a
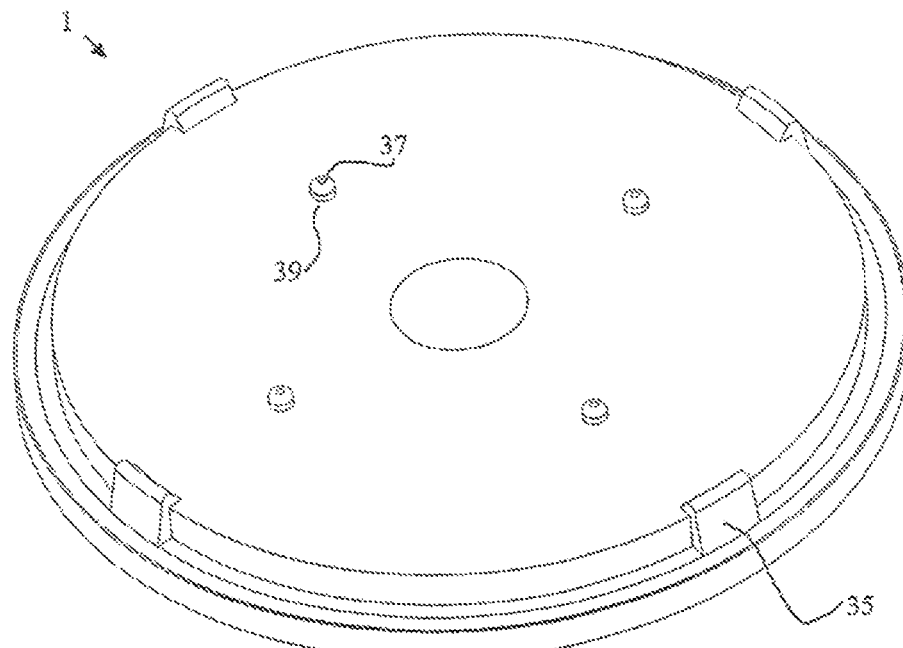
(Prior Art) Fig. 2b

AXIAL FLUX BRUSHLESS PERMANENT MAGNET ELECTRICAL MACHINE ROTOR

CROSS REFERENCE TO RELATED APPLICATIONS

This application claims priority to U.S. Provisional Application No. 62/156,556 filed on 4 May 2015.

FEDERALLY SPONSORED RESEARCH OR DEVELOPMENT

This invention was made with Government support under contract W31P4Q-09-C-0109 awarded by the U.S. Army Aviation and Missile Command and under contract N68335-15-C-0054 awarded by the Naval Air Warfare Center Aircraft Division and under contract NNX15CC15C awarded by the NASA Shared Services Center. The Government has certain rights in the invention.

FIELD OF THE INVENTION

This invention generally relates to electrical machines. More specifically, the present invention relates to rotor structure of a brushless axial flux permanent magnet (PM) electrical machines.

BACKGROUND OF THE INVENTION

Brushless axial flux PM electrical machines (motors and alternators) have been known for many years and embodied in many practical machines. The most common types are an axial version of a salient pole brushless permanent magnet machine. Such rotors feature magnets bonded onto (surface PM type) or embedded in (embedded PM type) an iron or electrical steel rotor structure. The stator windings are wound around steel poles or teeth comprised of stacked electrical steel laminations. A variant on this design would be the "slotless" design that retains an electrical steel "yoke" behind the windings to help complete the rotor excitation magnetic circuit, but does not have steel poles, teeth, or slots that the windings fit into. Somewhat less common are axial flux machines that feature no steel laminations. The windings may also be formed as a printed circuit board or punched from copper sheet. The variety of winding geometries interact with an annular disk of magnets that cause a changing flux through the coils as the annular disk of magnets rotate relative to the windings or vice versa. Even less common are "ironless" designs that feature a non-magnetic rotor structure and/or stator structure.

It is well known that in high speed permanent magnet machines special care needs to be taken to ensure that the magnets stay bonded onto the rotor in the case of a surface PM machine. It is also known that centrifugal stresses in the rotor may cause the magnets to crack because the magnet material is brittle and may not tolerate much tensile stress. Both surface and embedded PM machines must deal with centrifugal loading stresses.

In many high speed radial flux machines such as flywheel alternators, a steel band is applied outside the magnets using an interference fit. This applies static compressive stress into the magnets and the rest of the rotor material so that even under the centrifugal loading the magnets never go into tension. The interference fit usually requires very high tolerances on the two parts to ensure that sufficient compressive preload is generated without over-stressing any components. U.S. Pat. No. 4,638,200 issued to Le Corre et al. on 20 Jan. 1987 provides an example of this technique. This same technique has been applied to axial flux machines.

Other high speed radial flux machines utilize a carbon fiber wrap over the magnets on the outside diameter of the rotor. When the rotor spins quickly the high modulus fiber may act as an outer containment that prevents the magnets from coming off of the steel rotor. This technique is difficult to implement in practice as the carbon fiber wraps needs a significant preload/pre-stress tension to ensure that it carries the tensile load rather than the bonds of the magnets to the steel rotor. U.S. Pat. No. 6,047,461 issued to Miura et al. on 11 Apr. 2000 provides an example of this technique.

Another approach is shown in prior FIG. 1a and related FIG. 1b which is a cross section taken along line 1b-1b in FIG. 1a. Here, the approach is that of an alternating pole machine using magnets 40, 42 embedded into the material of the rotor plates 30, 32 on a shaft 16 with gaps between the magnets. This is a well understood structural design as the optimal arrangement of magnets for an alternating magnet rotor has gaps between the magnets. Putting structural material in these gaps is a well understood way to strengthen the rotor beyond the strength of the backing plate 34 behind the magnets. A rim 36 and restraining band 38 may, as before, be provided. Typically, this approach uses round magnets that have large gaps between them, although some examples using trapezoidal alternating pole magnets are known as well. U.S. Pat. No. 4,996,457 issued to Hawsey et al. on 26 Feb. 1991 provides an example of this technique with round magnets with alternating poles. The holes that the magnets are placed into do not have top or bottom surfaces on them.

Another approach is shown in prior art FIGS. 2a and 2b which provides an example of a known axial flux machine with alternating pole trapezoidal magnets 23 where a magnet locating and retaining device 1 is added to the magnetic rotor structure. This design may be understood as a hybrid of the surface mount PM and interior PM designs. By way of pins 37, apertures 39, and connecting clips 35, the retaining device assists in keeping the magnets attached to the rotor in the event of an adhesive failure, but the retaining device does not provide the primary structural restraint to carry the centrifugal loads from the magnets to the rotor hub. U.S. Pat. No. 8,598,761 issued to Langford et al. on 3 Dec. 2013 provides an example of this technique.

A notable concept in the advancement of motor design is the notion of the Halbach array. This is an array of magnets which orientations are chosen to focus magnetic field on one surface (called the strong or active surface) with the field on the other surface being much reduced (called the weak or inactive surface). As shown by way of FIG. 3., linear Halbach arrays are known and which focus fields on one side of a surface. U.S. Pat. No. 5,705,902, herein incorporated by reference, issued to Merritt et al. on 6 Jan. 1998 provides an example of this technique. A Halbach array may also be arranged in an annular ring such that the active surface faces along the axis of the annulus.

Halbach arrays of magnets are usually designed without gaps between the magnets to ensure that the magnetic field generated by the array has the highest magnitude possible; and also to minimize the harmonic content of the sinusoidal Halbach field. Sometimes, curved Halbach arrays are assembled out of rectangular parallelepiped for cost-saving purposes in which case there are "wedge shaped" gaps between the magnets that are sometimes filled with structural material if the array is built in a "pocketed structure." This is sometimes done with a Halbach array forming a cylinder with a radial field. Wedge shaped structures have stress concentrations and are suboptimal from a structural standpoint.

In axial flux Halbach machines, the magnets for the array are trapezoidal shape and are often bonded onto a rotor plate structure that is "behind" the array on the inactive surface—that is on the side of the array axially displaced opposite the machine active air gap. The trapezoidal shape of the magnets minimizes the gaps between magnets and maximizes the magnetic field of the array. Less expensive rectangular magnets may be used, but this results in a lower magnetic field and large wedge shaped gaps between the magnets at the periphery of the rotor. The adhesive bond in such a design is subject to failure at high rotor speeds. Prior art FIG. 4 shows one example of a Halbach array rotor structure 10 for an axial flux machine where the trapezoidal magnets (12A-1, 12B-1, 12A-2, 12B-2 and so on) are bonded to one another to form an annular ring 12.

A dual Halbach design is one where the active surfaces of two Halbach arrays are directed at a single winding. The rotor plates in a dual Halbach array axial flux motor must be designed to withstand the attractive axial forces from the magnet arrays and also centrifugal forces caused by the spinning of the rotor. Also the attractive forces deform the rotors and alter the magnetic gap. Depending on the detailed shape of the rotor, the centrifugal force may cause expansion, convex cupping, concave cupping and other distortion of the annular rotor. Prior art FIG. 5 shows such misalignment of the centrifugal forces 501 on the magnets 510 and the opposite restraining forces from the rotor structure 502. This misalignment of forces creates a bending moment within the rotor structure that causes the rotor to distort to a cup shape at high speeds as shown in the dashed line areas 510a. These distortions must be minimized to maintain the gap in the motor. Further, any deformation of the rotor may apply stresses to the magnets which generally have modest strength and are brittle.

Halbach arrays are used in electrical machines that are lightweight. To this end, the magnets are a significant portion of the mass of the machine rotor. When the Halbach array of magnets is bonded together into an annular ring, the solid ring becomes very stiff relative to the lightweight materials used in the rotor structures such as titanium or aluminum. When the machine rotor is spun to high speeds, a hoop stress is experienced by the rotor materials. Since the relatively thick bonded magnet assembly is significantly stiffer than the thin, lightweight rotor plate all of the hoop stress will be carried by the magnet assembly.

Hoop stress due to centrifugal acceleration in a thin rim of material is known to be computed as $\sigma_t = \rho \times \text{velocity}^2$ where at is the tensile stress in the hoop, p is the density of the hoop material, and velocity is the surface speed of the cylinder. Based on the density of neodymium iron boron magnets of 7.5 gm/cm$^3$, it may be computed that at a surface speed of 100 m/s the hoop tension stress in the annular magnet ring assembly will be approximately $7.5*10^7$ Pa (10,880 psi) which far exceeds the tensile bond strength of most epoxies and is approximately equal to the tensile strength of the sintered neodymium iron boron magnet material. The above calculation is greatly simplified, but when the more complicated thick wall calculations are done the stresses are found to be even higher. High speed electrical machines typically have surface speeds even greater than 100 m/s. Thus, at any reasonable speed for a machine categorized as "high speed" with magnets in a solid annular ring and a lightweight rotor, any bonds between the magnets will break and even the magnets themselves are subject to breaking.

Because the magnets may not withstand the centrifugal tensile forces from high speed operation, those forces must instead be taken by the rotor structure such as the backing plate that the magnets are bonded to. If the rotor structure is very thick and heavy relative to the magnets, there will only be a small strain in the rotor material. However, if the rotor structure is thin and lightweight, then the rotor materials must undergo a significant strain as they will be under significant centripetal tensile stress.

The magnets, however, are brittle and may not undergo significant strain without cracking. These magnets are bonded to the rotor structure, which is highly stressed and strained in a lightweight machine. Thus, the bond layer between the magnets and the rotor structure on the inactive surface of the Halbach array will likely fail or the magnets will end up being cracked as the rotor structure stretches and experiences strain due to the centrifugal loading.

These computations show that it is difficult to make an axial flux Halbach array rotor structure that is lightweight and which structurally withstands operation at surface speeds greater than 75 m/s.

Additional structural problems arise once the magnet structure is no longer a solid ring but is a collection of separated masses attached to the rotor structure. In a surface PM machine, the mass of the magnets is not located along the centroid of the rotor structure with regards to the centrifugal forces on the magnets as the magnets are mounted on the surface of the rotor structural member.

It is therefore desirable to overcome the aforementioned problems associated with the prior art.

SUMMARY OF THE INVENTION

It is an object of this invention to maximize rotor strength for high-speed operation while minimizing structural mass.

It is an object of this invention to minimize the distortion of the rotor and stresses on magnets across a wide range of operating speeds.

A further object of this invention is to provide a centrifugal load path that allows the magnets to be constrained against radial movement under high centrifugal loading without subjecting the bonds on the radial sides and top/bottom of the magnets to excessive shear or tensile stress.

A further object of this invention is to increase the axial stiffness of the rotor plate to minimize axial deflection of the plate due to axial magnetic forces and circumferential bending forces from centrifugal loading.

Another object of this invention is to address centrifugal loading on the rotor plate structural section in order to minimize cupping and other distortions of the rotor by placing the centroid of the rotor structure closely in alignment with the centrifugal forces on the magnets.

The present invention provides an axial flux brushless permanent magnet electrical machine including: a stator; and at least one rotor, the rotor including a Halbach array of magnets consisting of at least four magnets per magnetic cycle, the magnets in the rotor are contained within pockets in the rotor, the pockets are formed partly by an outer predominantly circumferential wall that retains the magnets against centrifugal load and partly by radial walls between adjacent magnets in the Halbach array, the radial walls join with hub structure of the rotor on an inner end thereof and with the circumferential wall on an outer end thereof, and the radial walls have a varying circumferential dimension, while through any circumferential section the radial walls have a larger axial dimension than their circumferential dimension with reference to an axis of the electrical machine.

The present invention also provides an axial flux brushless permanent magnet electrical machine including: a stator; and at least one rotor, the rotor including a Halbach array of magnets consisting of at least four magnets per magnetic cycle, the magnets are contained within pockets, the pockets are formed partly by an outer predominantly circumferential wall that retains the magnets against centrifugal load and partly by radial walls between adjacent magnets in the Halbach array, and the radial walls join with hub structure of the rotor on an inner end thereof and with the circumferential wall on an outer end thereof, where the axial dimension of the radial walls is chosen larger than the smallest circumferential dimension of one of the magnets.

Still further, the present invention also provides a rotor for an axial flux brushless permanent magnet electrical machine, the rotor including: an annular ring; and an annular Halbach array of magnets with an active surface of the array directed along an axis of the annular ring, the array having at least four magnets per magnetic cycle, each magnet being un-bonded to an adjacent magnet in the annular ring in at least four locations around the ring.

BRIEF DESCRIPTION OF THE DRAWINGS

FIGS. 2a and 2b show a known non-structural pocketed magnet aligning device that is attached to a structural rotor plate.

FIGS. 16b through 16g are two dimensional diagrams illustrating possible alternative constructions of pocket walls according to the invention in views similar to FIG. 16a.

DETAILED DESCRIPTION

Figure 1A:
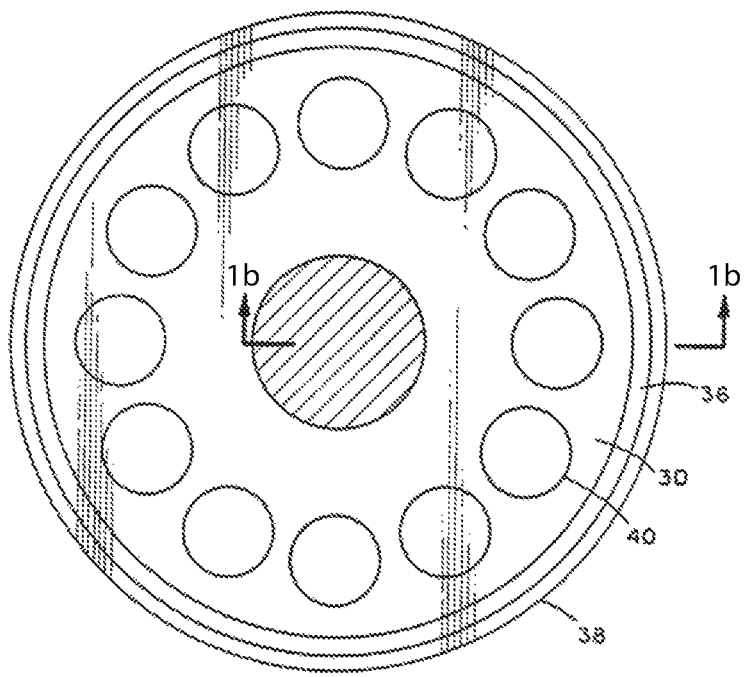
FIGS. 1a and 1b show known high speed electrical machine rotor structure with round magnets bonded into pockets in the rotor structure with thick walls and no strain relief between magnets.
Figure 1B:
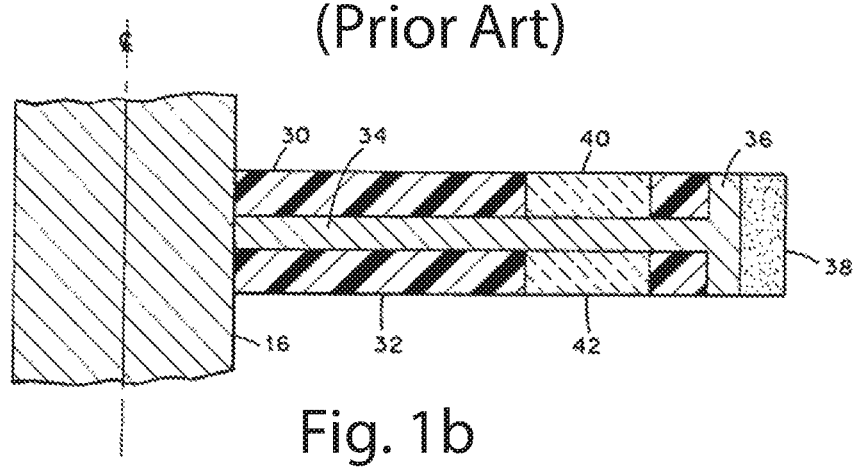
Figure 3:
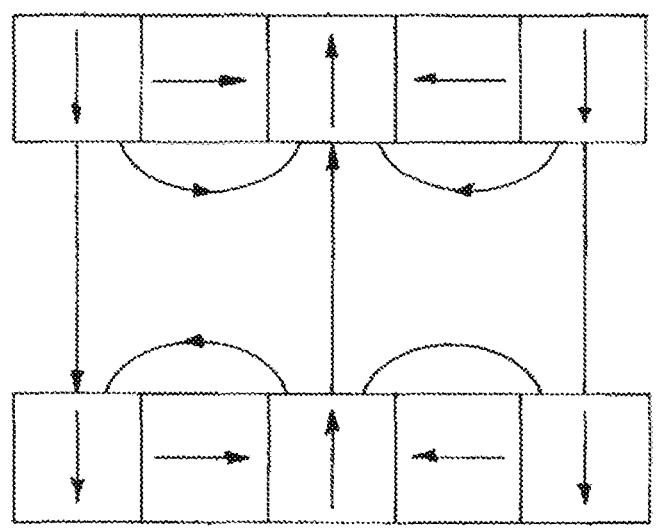
FIG. 3 shows a known linear dual Halbach array structure.
Figure 4:
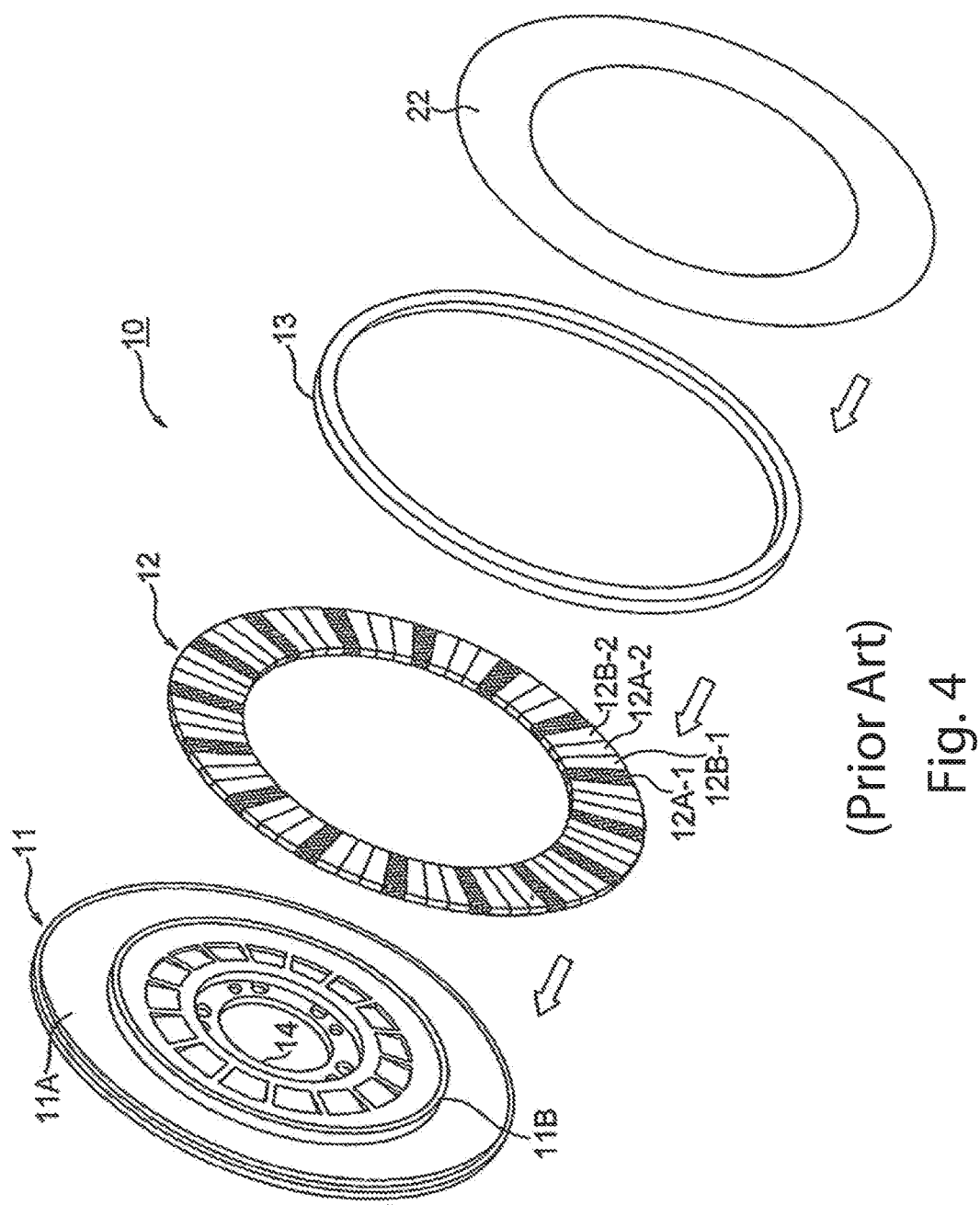
FIG. 4 shows a known rotor for an axial flux Halbach array machine with a surface mount Halbach permanent magnet array with no gaps or strain relief in the annular ring of magnets.

The invention described herein includes a rotor for an axial flux permanent magnet brushless electrical machine using a Halbach array of magnets in the rotor. Such an electrical machine will of course require a stator along with necessary electrical, electronic, and power-related components so as to form a working machine. It is to be understood that the preferred embodiment represents a complete electrical machine including rotor(s), at least one stator, a housing, a shaft, and bearings, though a frameless electrical machine formed solely of rotor plates and the stator also constitutes an embodiment of the invention that may be incorporated into other machines that provide the bearings, shafts, and support structures. For purposes of clarity however, details of components other than the inventive rotor structure should be understood as well known in the motor and generator art and are not discussed in detail herein.

Referring now to the drawings, it should be understood that like reference numerals designate corresponding structure throughout the views.

Figure 6:
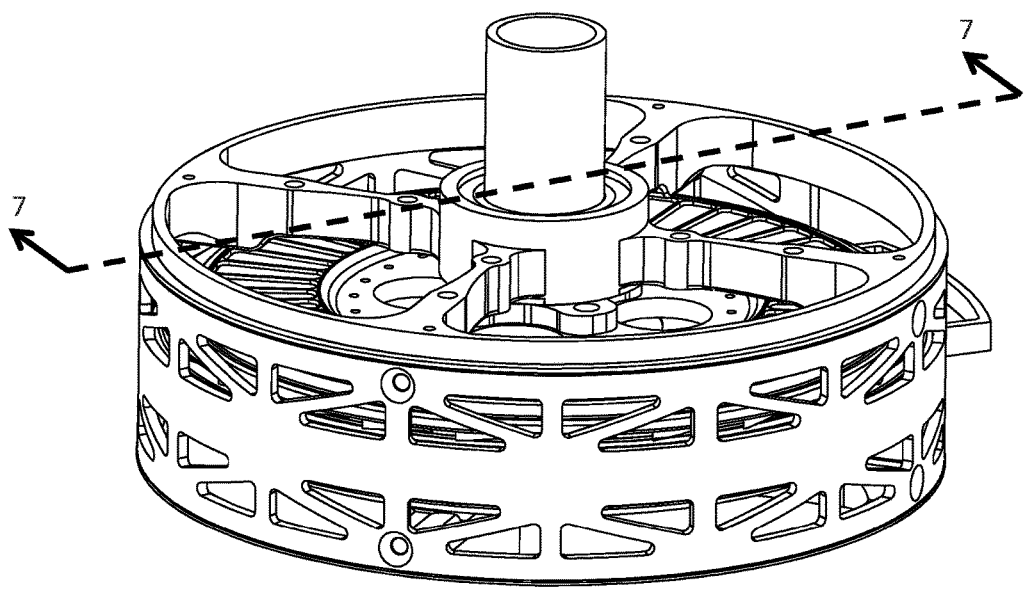
FIG. 6 is a perspective view of a dual Halbach array electrical machine according to an embodiment of the invention.

With regard to FIG. 6, there is shown a perspective view of a dual Halbach array electrical machine according to an embodiment of the invention. With further regard to FIG. 7, there is shown and detailed a cross section view of the machine in FIG. 6 along the line 7-7 thereof. Here, the inventive electrical machine may be seen to include a stator 701, two rotor magnet array structures 702, a rotor shaft 703, housing structures 704, and bearings 705.

Figure 7:
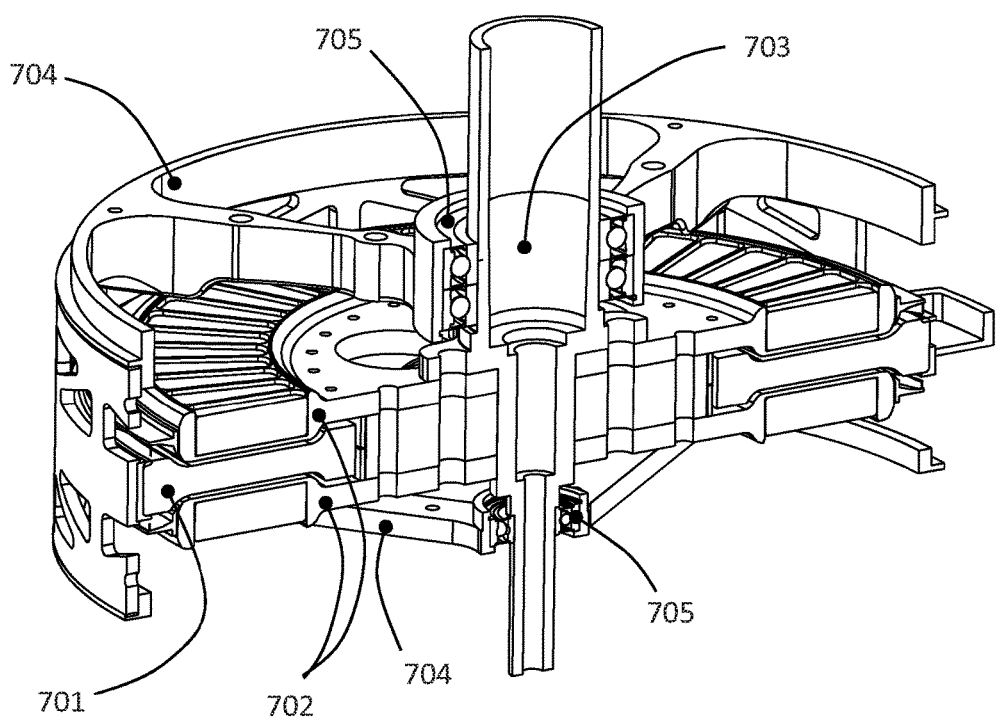
FIG. 7 is a cross section view of the machine in FIG. 6 along the line 7-7 thereof.
Figure 8:
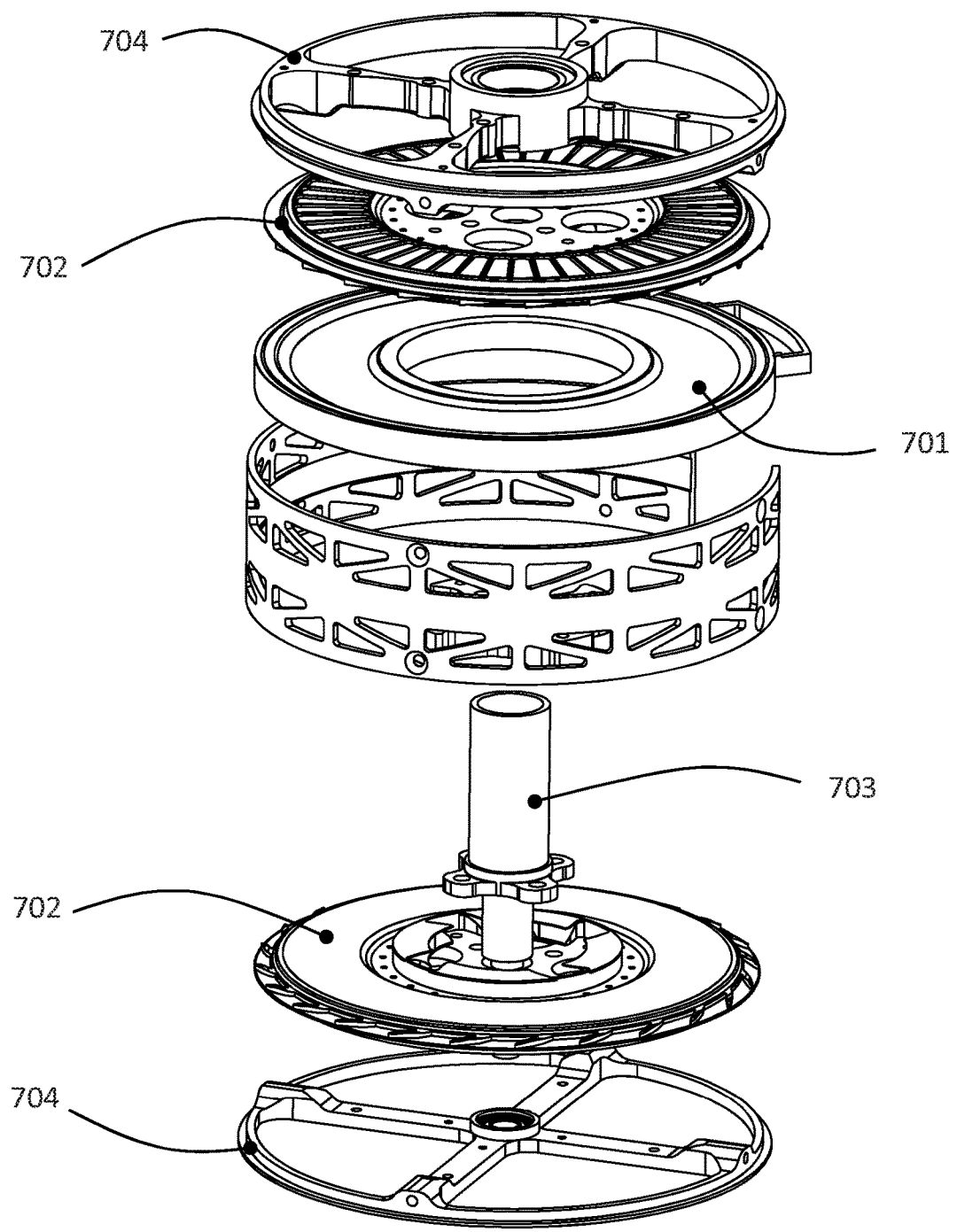
FIG. 8 is a perspective view of the exploded assembly of the electrical machine in FIG. 6.

With regard to FIG. 8, there is illustrated an expanded view of the electrical machine seen in FIGS. 6 and 7. Here, the relative arrangement of machine components is visible including two housing structures 704 between which a centrally placed stator 701 resides. Adjacent the stator 701 are the two rotor magnet array structures 702 each being centered upon the rotor shaft 703. The rotor magnet array structures 702 being the subject of the present invention will be further described hereinbelow.

Figure 9:
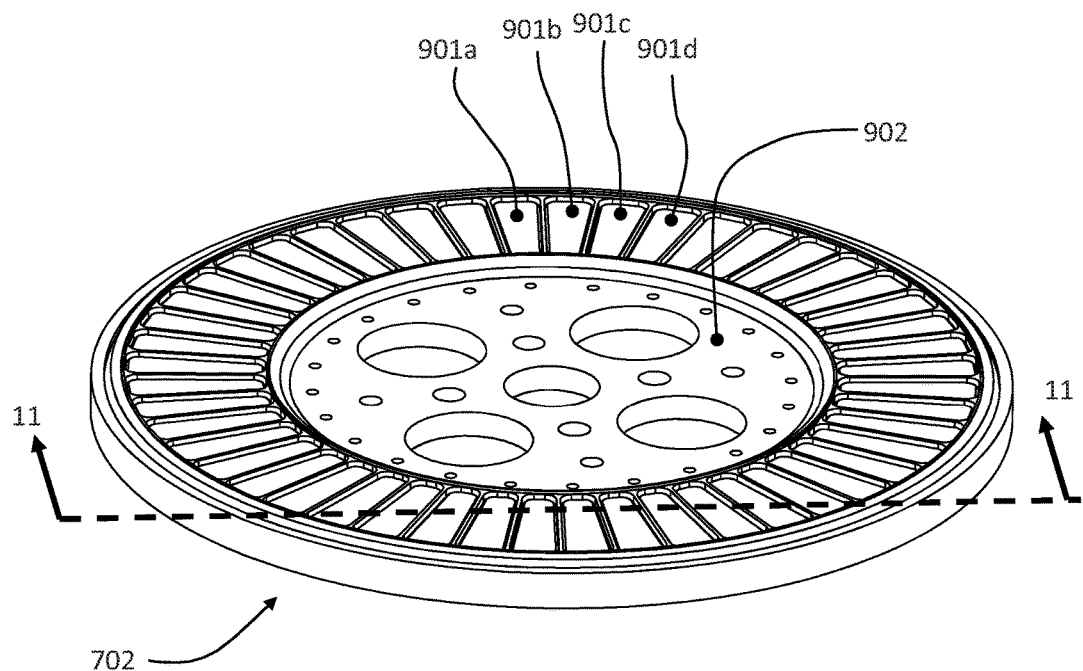
FIG. 9 is a perspective view of one of the rotor plates from the electrical machine in FIG. 6.
Figure 10:
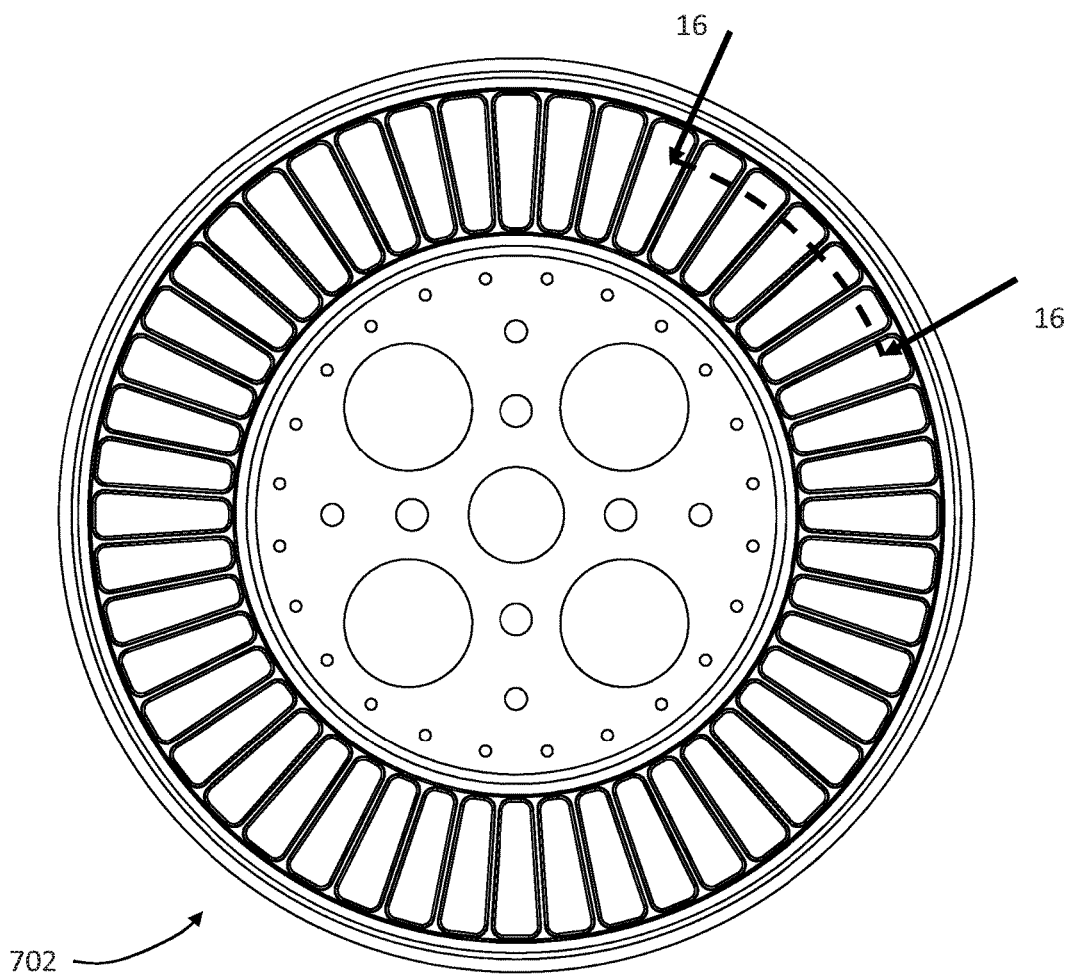
FIG. 10 is a top view of one of the rotor plates from the electrical machine of FIG. 6.

Referring now to FIG. 9, a single rotor magnet array (i.e., "rotor") 702 in accordance with the present invention is shown in perspective view and in top view in FIG. 10. The rotor 702 is a circular structure that contains a Halbach array of magnet elements (i.e., "magnets") 901a, 901b, 901c, 901d, and so on, in multiple locations in an annular region. The magnets are arranged to create a field that projects on one side of the rotor that varies nearly periodically around the circumferential direction of the rotor. The Halbach array may contain four (4) magnet elements per magnetic cycle with the orientation of the magnetization of each magnet varying by 90 degrees from the previous magnet. Alternatively, the Halbach array may have more elements per magnetic cycle—e.g., six (6) elements per cycle being one example with the magnetization direction of each magnet varying by sixty (60) degrees from the previous magnet. Other magnet counts per cycle are also possible as alternative embodiments of the present invention.

Figure 11:
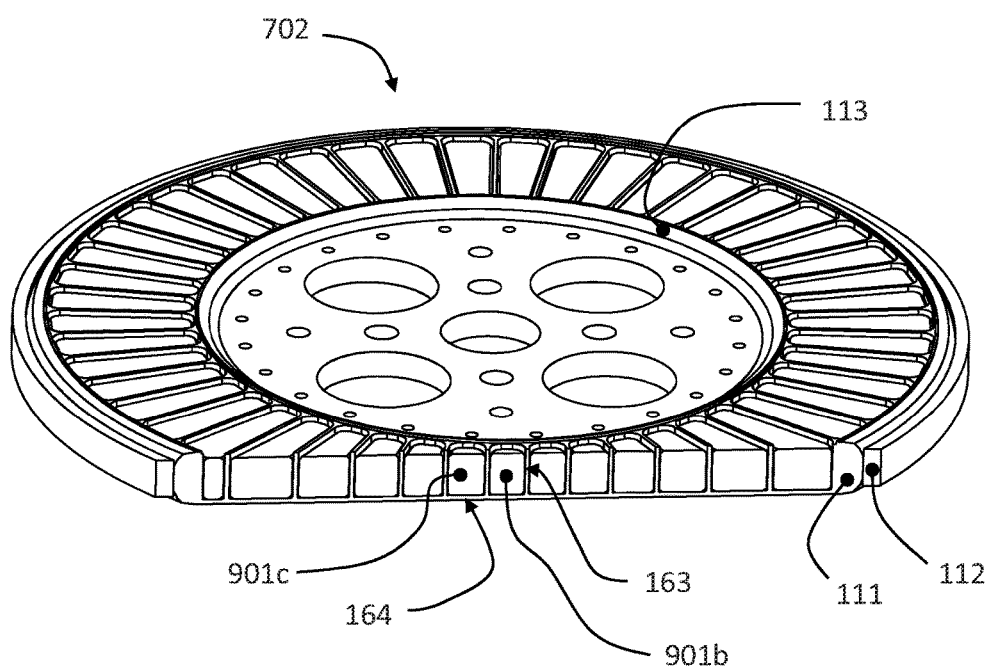
FIG. 11 is a perspective section view of the rotor in FIG. 9 along the line 11-11 thereof showing pockets with magnets along with circumferential walls, radial walls, and an active surface wall on the side of the magnet array with a strong magnetic field.

With regard to FIG. 11, a partial cutaway view of the rotor 702 relative to FIG. 9 is shown having a section removed along line 11-11 of FIG. 9. Here, the cross section allows pocket walls to be seen including outside diameter (OD) circumferential wall 111 that counter centrifugal forces applied to the magnets and inside diameter (ID) circumferential wall 113. Radial walls 163 extend between the OD circumferential wall 111 and the ID circumferential wall 113 to thereby form the pockets within which each magnet (e.g., 901b, 901c) resides. The rotor also includes surface wall 164 which completes each pocket. Here, the surface wall 164 shown is an "active" surface—i.e., the array of magnets is arranged in the pockets in an orientation chosen to focus magnetic field on active surface wall 164. In contrast, if the array of magnets were arranged in the pockets in an orientation chosen to focus magnetic field oppositely, then such surface wall would be considered inactive due to the field on that surface being much. Such inactive surface wall 165 will be shown and described later with regard to FIGS. 14, 15, 16a, 16c, 16f, and 16g.

With continued references to FIG. 11, the OD circumferential wall 111 may be made of two materials and include a separate strength member 112 in the form of a band made of stronger or stiffer material to help the OD circumferential wall 111 contain the magnet centrifugal forces. One example of a suitable band is a filament wound composite hoop that has high stiffness due to the directional nature of the filament wound fibers. If a polymer rotor structure is incorporated, a metallic band may be used as part of the OD circumferential wall 111. The ID circumferential wall 113 may be omitted as centrifugal forces dominate. The active (or inactive) surface walls may be welded, adhered, or otherwise attached to the rotor to protect the magnets from corrosion or damage and also add strength to the rotor. The pockets may also have only active (or inactive) surface walls with the radial walls being only partial walls or locational features.

In the present invention, it should be readily apparent that the rotor structure has pockets in an annular region into which the magnets of the Halbach array are inserted. It should also be understood that the pockets may vary without straying from the intended scope of the present invention wherein the pockets may be axially disposed while going all the way through the rotor plate material, part way through the plate from one side, or be placed on both sides of the plate. The pocket walls and pocket surfaces locate the magnets and also provide structural strength to the rotor overall structure. For example, an alternative rotor is shown with regard to FIG. 12 having surface walls in every other set of opposing pockets. Correspondingly, the magnets located in pockets of FIG. 12 may therefore vary in overall size.

Figure 16A:
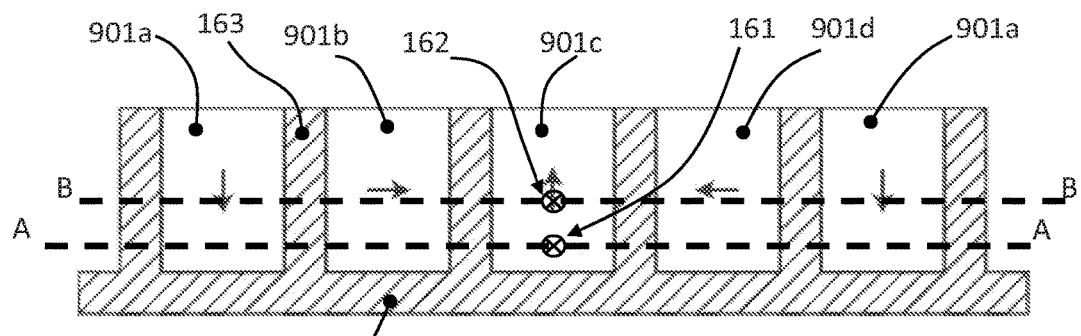
FIG. 16a is a two dimensional diagram illustrating the construction of pocket walls viewed radially along a circumferential section view of the rotor taken along line 16-16 in FIG. 10.
Figure 16B:
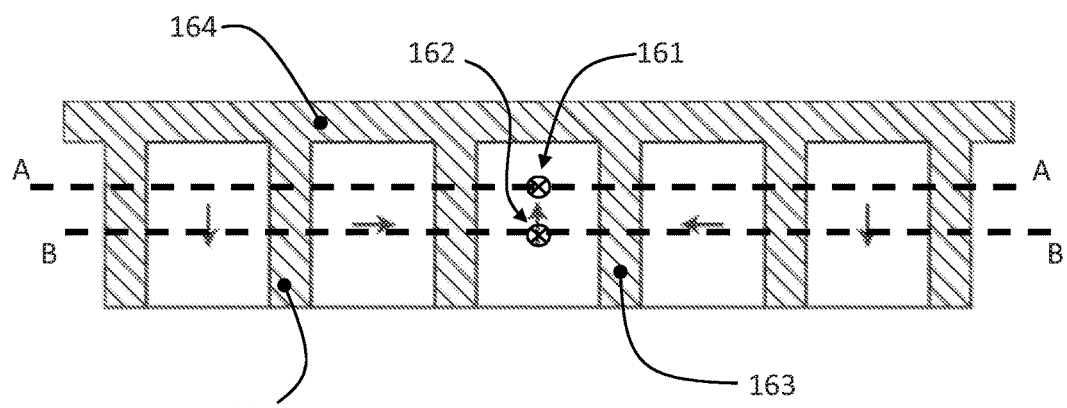
Figure 16C:
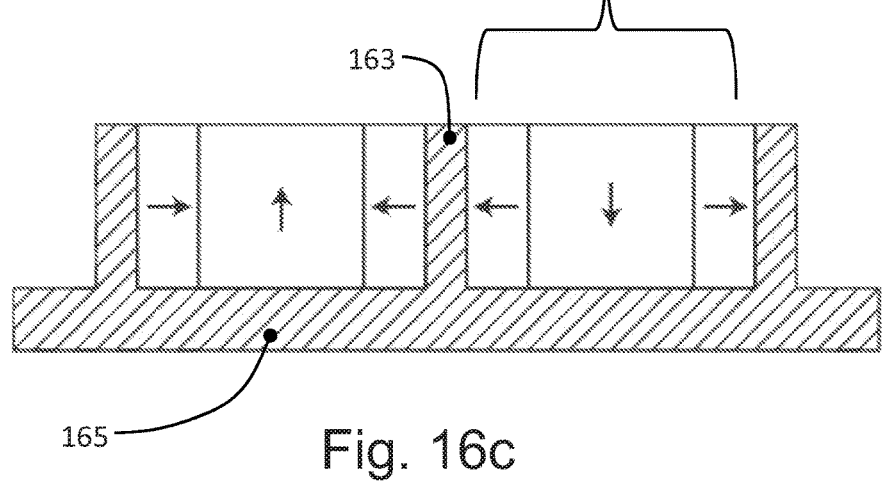
Figure 16D:
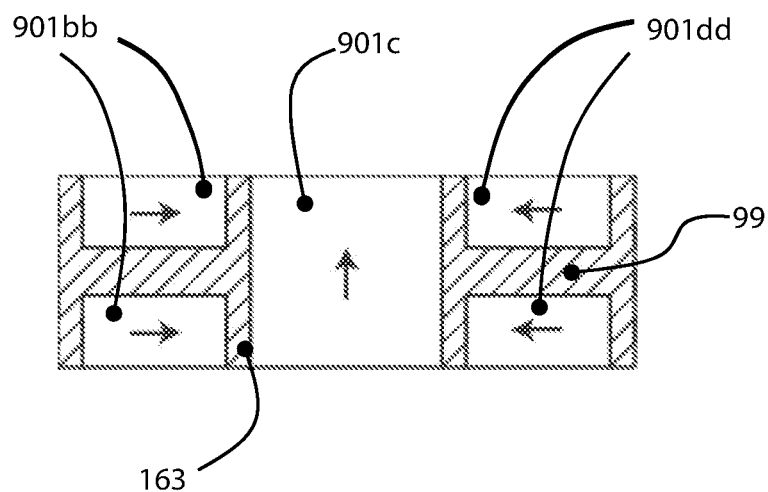

It should be understood that regardless of the location and orientation of the pockets and walls, the magnet orientations are a Halbach array which focusses the magnetic field on the active side of the rotor where the conductors are placed. For purposes of the present disclosure in defining a Halbach array in accordance with the instant invention, material may be placed between magnets while keeping the periodic orientations of magnets commonly used in Halbach arrays. Further, it may be the case that magnet(s) is/are split so that structural material may be inserted in a particular location or material may be placed in between some of the magnets or some combination thereof, the material then forming pocket walls. Sub-groups of magnets may be bonded directly together to form magnetic sub-units, and then each sub-unit placed into a pocket instead of having one pocket for each individual magnet as shown in FIGS. 16c and 16f.

Figure 14:
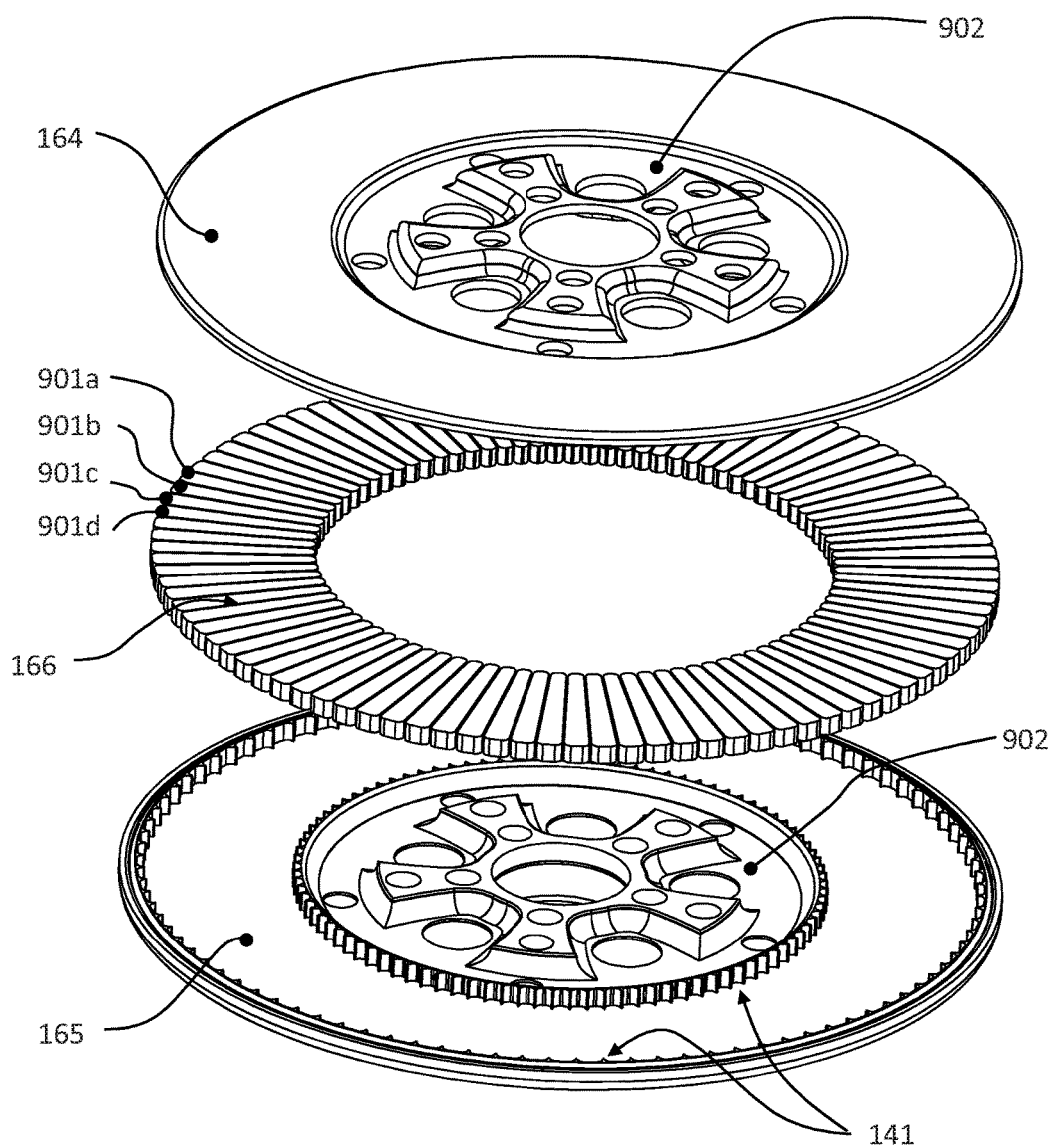
FIG. 14 is a perspective view of a partially exploded assembly of a carbon fiber rotor according to another embodiment of the invention.

The rotor structures in FIGS. 9 and 14 also show a hub structure 902 that connects the pocket walls to a central location where the electrical machine shaft or bearings may be located to allow the rotor to rotate. In some embodiments, there may not be a shaft and the rotor hub structure has bearings affixed that allow the rotor to spin on a fixed structure. Such details are well within the common knowledge of one skilled in the motor and generator structure art and are therefore not further described herein.

Figure 5:
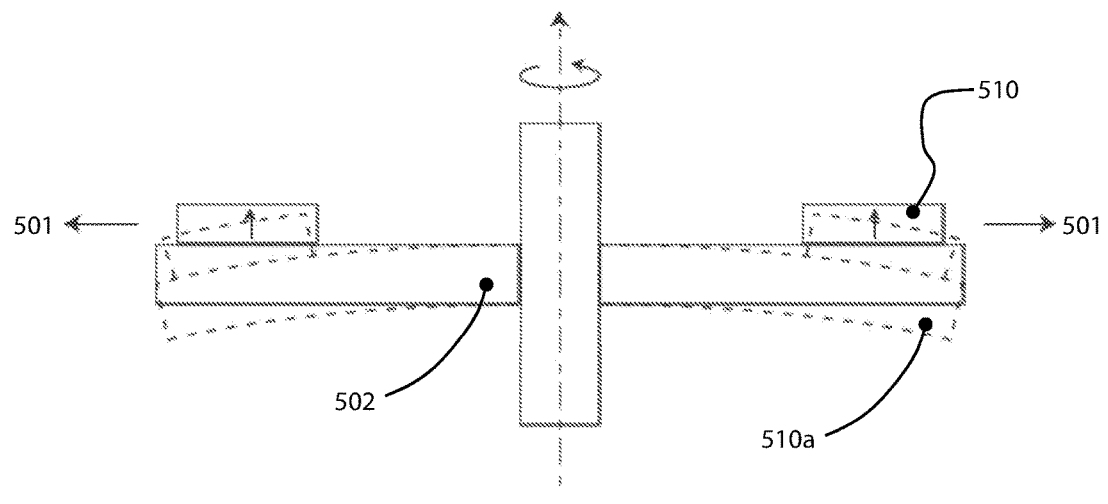
FIG. 5 is a generalized sectional diagram of a known surface mount permanent magnet axial flux machine rotor showing how the centripetal acceleration forces on the magnet put a bending moment into the rotor structure causing axial deformation of the rotor at high speed.

One advantage of the pockets in accordance with the present invention is that the magnets are located axially within the thickness of the rotor plate structure so that the radial centrifugal forces on the magnet are more closely aligned with the centroid of the rotor plate structure with regards to radial forces. This beneficially reduces the circumferential bending moment on the rotor plate structure and minimizes distortion of the rotor plate at high speeds as previously shown and described with regard to problematic prior art FIG. 5.

Another further advantage of present invention is that the pockets create strength members formed by the pocket wall material further enabling high-speed operation. For example, FIGS. 16a through 16g illustrate a variety of alternative rotor structure cross-sections showing a radial view into a circumferential section of the rotor structure. More specifically, FIG. 16a is a two dimensional diagram illustrating the construction of pocket walls viewed radially along a circumferential section view of the rotor taken along line 16-16 in FIG. 10 while FIGS. 16b through 16g are two dimensional diagrams illustrating possible alternative constructions of pocket walls according to the invention in views similar to FIG. 16a. The magnets are brittle and structurally deficient, so they may not be seen as adding strength to the rotor. The pocket walls seen in section in FIGS. 16a through 16g thus represent the load carrying members of the rotor structure. Centrifugal forces on the magnets create tensile forces into and out of the page in these views centered along line B-B through the areal centroid 162 of the magnet sections.

The cross section of the pocket walls in FIGS. 16a though 16g may be seen as a structural section in both tension and bending. The bending neutral plane will pass through horizontal line A-A (understood to be a cross-sectional area similar to section 16-16 in FIG. 10) through the axial location of the areal centroid of the structural cross section 161. The magnet centrifugal forces are in the direction out of the page along line B-B. To the extent that line B-B (also understood to be a cross-sectional area similar to section 16-16 in FIG. 10) does not lie on top of line A-A, the rotor structure experiences a bending moment around A-A proportional to the magnitude of the centrifugal force and the distance between lines A-A and B-B. The distance between line A-A and line B-B indicates how imbalanced the centrifugal loading is on the rotor structural cross section. Thus, attractive axial forces between the magnet arrays and the centrifugal forces that are out of alignment with the rotor structure neutral plane A-A create bending moments about line A-A in FIGS. 16a through 16g. The section properties of the rotor structural cross section determine the ability of the rotor structure to resist axial deformation from these bending moments.

Still referring to FIGS. 16a through 16g, it may be seen that the radial walls 163 serve to increase the bending section properties of the rotor structure, which is the area moment of inertia of the rotor cross section about line A-A. The material that the radial walls add to the rotor structure section is added in a balanced manner above and below line B-B that keeps the centroid of the rotor structure located close the mid-plane of the magnets where the magnet centroid 162 is located, minimizing bending moments from the magnet centrifugal loading.

It may be seen that the active 164 and inactive 165 surface walls add the most significantly to the rotor structural section properties, being the most distant from the neutral plane line A-A through the rotor section area centroid 161. However, the active surface wall intrudes into the electrical machine air gap and thus must be limited in thickness. If only the inactive surface 165 is made thicker, the rotor structure bending neutral plane will be moved significantly away from the centrifugal forces along B-B and the bending moment in the rotor structure will be greatly increased. Ideally, the active surface and inactive surface walls would be the same thickness to create the most balanced structural section. In such instance, the radial walls are not required for their structural section properties. This is shown in FIG. 16g.

However, in many applications the unbalanced axial load from the magnet arrays as well as manufacturing constraints lead to acceptable designs where the active and inactive surface walls are different thicknesses, or where one or both surface walls are completely absent, relying on the radial walls to create desirable rotor structure section properties.

Yet another benefit is that the radial pocket walls provide strain relief for the annular array of magnets allowing the rotor structure to have significant circumferential strain without putting strain or stress into the magnets which would cause them to crack. FIG. 16g shows that even when the radial walls are not required for their rotor structural cross section properties a non-structural radial wall 166 of minimal thickness is retained to provide strain relief and provide an expansion joint between the magnets.

Figure 15:
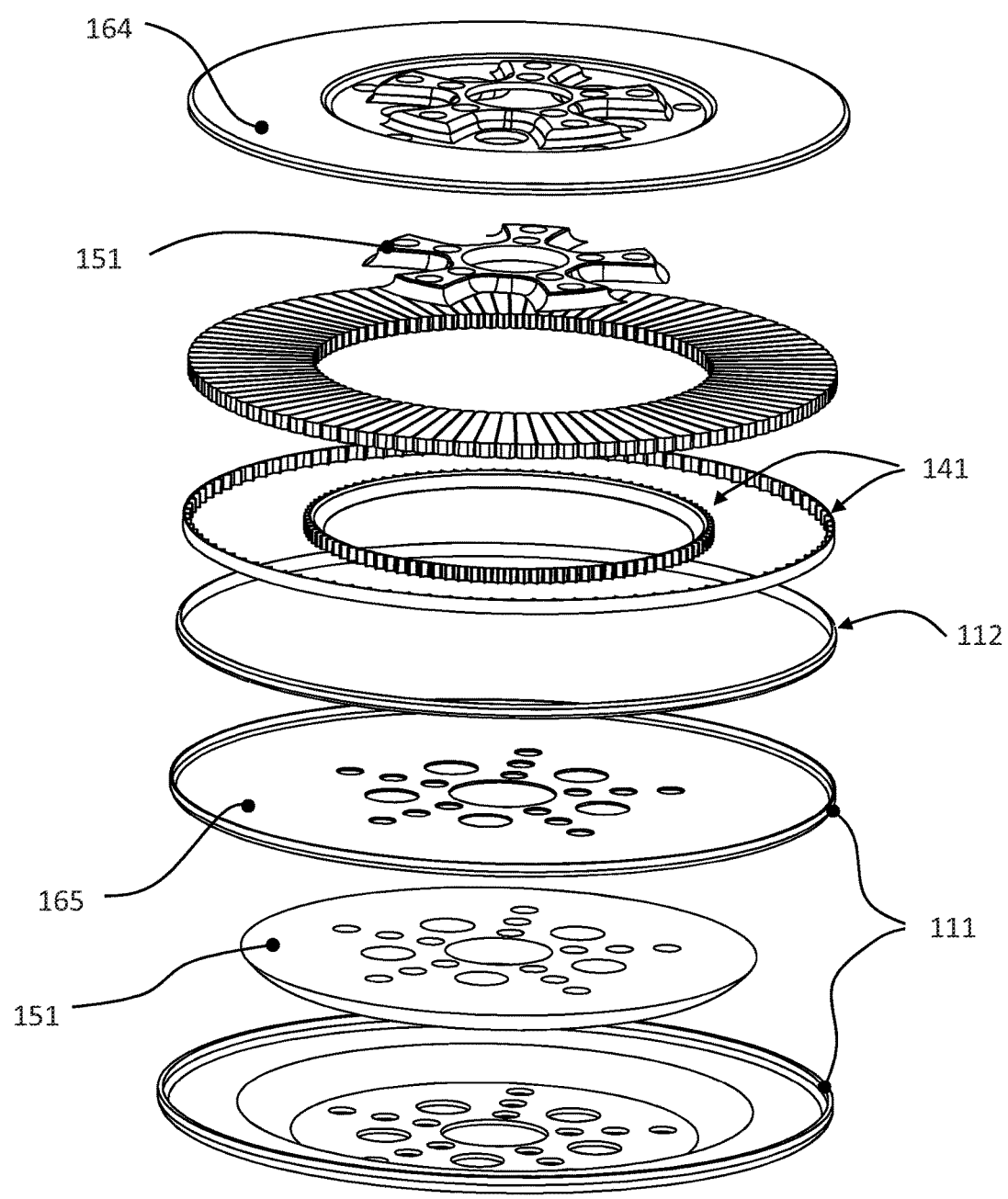
FIG. 15 is a perspective view of a fully exploded assembly of the rotor in FIG. 14.

The rotor is manufactured from a non-ferromagnetic material such as aluminum, titanium, plastic polymer, glass fiber composite, or carbon fiber composite that may include foam or honeycomb lightweight core structures 151 in FIG. 15. The pockets may be machined into a disk of the given non-ferromagnetic material, or the material may be built up additively. In the case of a metallic or plastic rotor 3D, printing techniques such as SLS (selective laser sintering) or FDM (fused deposition modeling) may be used to fabricate the rotor. In the case of a composite material, standard molding and layup/impregnation techniques may be used to manufacture the pockets. As previously discussed, the outer wall may be formed partially or completely by a hoop wound composite structure shown as 112 in FIGS. 11 and 15. The rotor structure may also be a combination of materials such as, but not limited to, a metallic or polymer disk and pocket structure with composite fiber reinforcements added as an outer hoop or active or inactive surface covers over the magnets. The pockets may also be formed by casting or stamping/forging operations; possibly with some post-machining operations; or by injection molding. The pocketed rotor may also be formed by extruding a long section containing all the pockets and then cutting off slices for each individual rotor plate.

In embodiments where the pocket does not extend through the rotor, a surface (the active surface wall or inactive surface wall) provides mechanical location of the magnets during assembly and also provides additional bonding area for the magnets to be bonded into the rotor plate. The surface wall may be on the active side of the Halbach array located near the machine magnetic air gap in which case the surface also serves as a mechanical magnet retaining feature that prevents a magnet that comes un-bonded from moving into the machine air gap and jamming the machine. The pocket surface wall may be located on the inactive surface of the magnet array on the side of the array opposite the machine magnetic air gap. In this case, the pocket surface wall provides bonding and mechanical location without infringing on any of the magnetic gap of the electric machine allowing for higher machine performance. FIG. 16d shows that the pockets may also be on both sides of the plate so that the pocket surface wall 99 is axially intermediate between the active and inactive surfaces to create a web part way (axially) through the rotor—such a placement may be tuned to reduce "cupping" of the rotor at high speeds due to centrifugal forces. Such a pocket surface wall is called an "pocket intermediate surface wall." Further, a pocket intermediate surface wall is preferred to be parallel to the active and inactive surfaces, but need not be. The pockets from both sides may be aligned with each other or not in the circumferential direction. Similarly, the pocket depths may vary for various magnets around the rotor. However, identical pocket depths and magnet dimensions reduce the manufacturing costs of the rotor.

Figure 12:
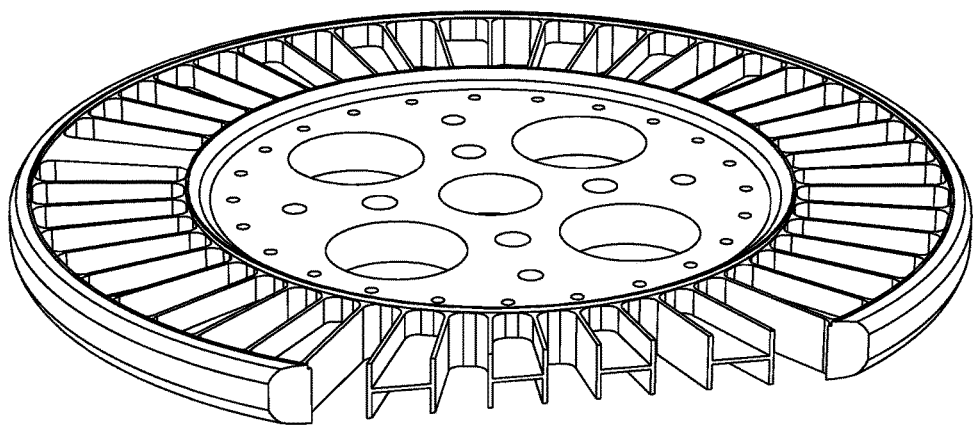
FIG. 12 is a perspective section view of an electrical machine rotor in accordance with another embodiment of the invention without magnets and showing pockets for magnets with circumferential walls, radial walls, and intermediate surface walls between the active and inactive surfaces of the array in some pockets.
Figure 16E:
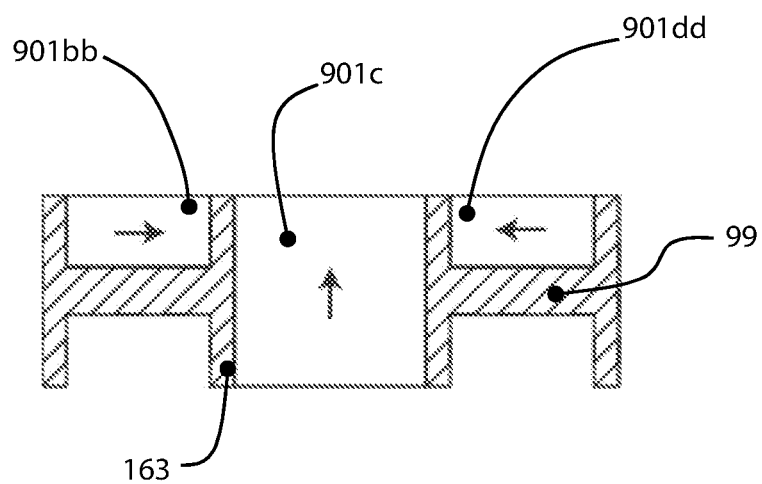
Figure 16F:
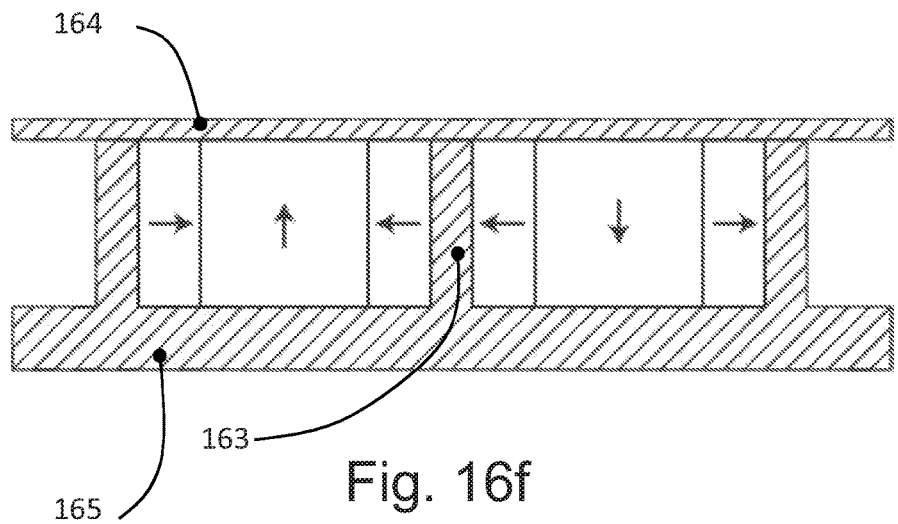
Figure 16G:
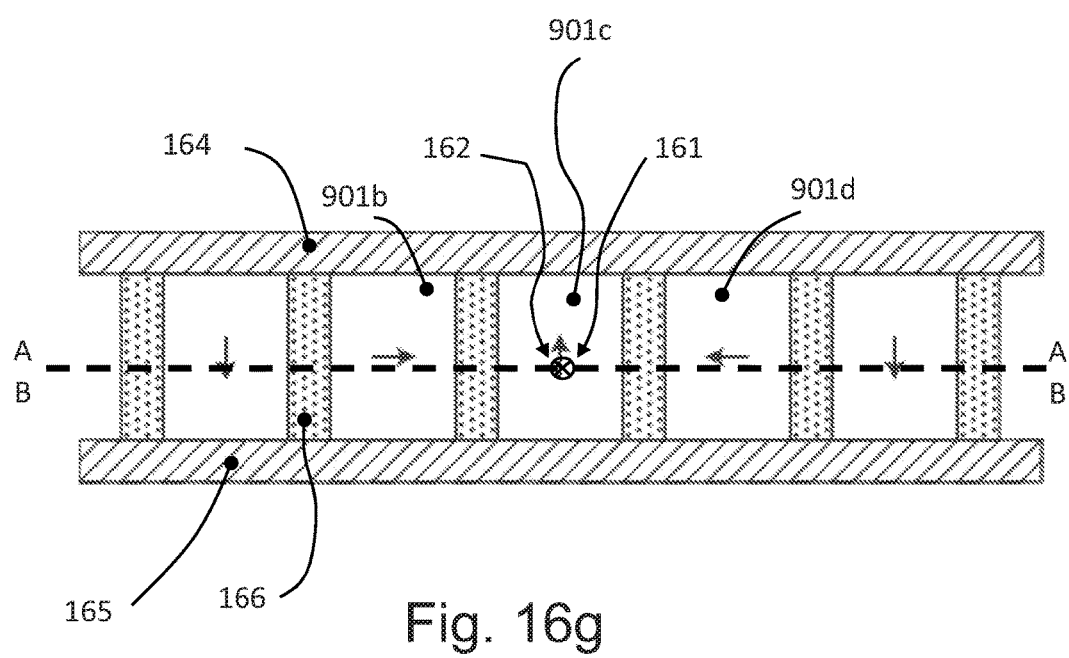

FIG. 16e shows rotor magnets where some magnetic material, namely a complete magnet relative to FIG. 16d, is removed. FIGS. 16d and 16e are variations with magnets 901bb, 901dd, 901c that correspond to the embodiment as shown in FIG. 12 without magnets. Such removal of magnetic material near the inactive surface will reduce the weight of the rotor and have minimal effect on the active surface magnetic field relative to removing magnetic material closer to the active surface.

The pockets may be created by machining the pockets into a solid plate of material with an end mill and setting the cutting depth to not penetrate through the material. Alternatively, 3D additive manufacturing techniques may be used. The surface walls may also be created by welding on a separate flat annular cover to a pocketed plate that has pockets all the way through the plate.

Figure 13:
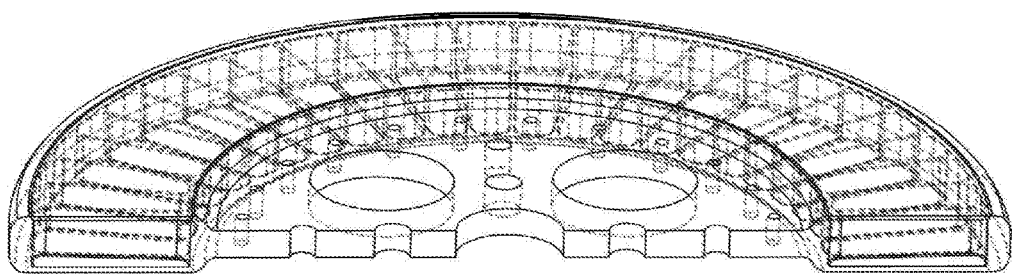
FIG. 13 is a perspective section view of an electrical machine rotor in accordance with another embodiment of the invention without magnets and showing pockets for magnets with circumferential walls, radial walls, and active and inactive surface walls.

In yet another embodiment of the invention shown in FIG. 13, the pockets feature both active and inactive surface walls. Assembly begins with a pocketed plate, possibly with one surface wall. The surface wall may be on the active or inactive side of the Halbach array. Then, the magnets are bonded into the pockets. Finally, the opposite surface wall is added. Several methods exist to do this. One or both cover plates may be attached by welding, by laser welding, adhesives, friction welding, screws, rivets, or any other fastening method. Further, a cover plate may be added using additive manufacturing processes around the bonded in magnets.

FIGS. 14, 15, and 16g show yet another embodiment with both active surface and inactive surface walls where the radial walls are no longer required for stiffness and structural load bearing, but are retained as locating features for magnet assembly and as a strain relieving feature to prevent hoop stress in the magnets. In this embodiment, the radial walls may be of a different material than the surface walls. The surface walls and rotor disks may be manufactured from carbon fiber or glass fiber composite or an engineering polymer. The radial walls may be polymer or epoxy that may have fiber reinforcement. The radial walls may also be made of a compliant soft material to fill the gaps between the magnets but remain flexible to allow the gaps between magnets to grow under high centrifugal loading without building up significant hoop stress. Different sections of the radial walls may be different materials; the outer and inner diameter ends of the radial walls 141 may be a stiff material for locating the magnets while the middle parts of the radial walls 166 in between the magnets may be a more compliant material for strain relief. In this embodiment, the active surface plate 164 and inactive surface plate 165 are manufactured separately. One plate has an outer hoop 112 that carries the radial centrifugal acceleration forces of the magnets and radial wall ends 141. The magnets are bonded into that plate and then the filler material 166 is molded around the magnets forming a relatively compliant, form fitting pocket around the magnet to carry the radial outward compressive stresses to the outer hoop and to allow compliance and strain between the magnets. The opposite surface plate is then attached onto the assembly using adhesives or welding processes. It is to be understood that the exact order of operations and details of the manufacturing process does not define the invention and that there are multiple different variations on the manufacturing and assembly processes that will arrive at the invention described herein. For example, the magnet assembly with radial pocket walls, but no surface walls, may be manufactured first; and then the active and inactive pocket surfaces and plates added afterwards.

The magnets will be designed to have the narrowest circumferential gaps allowable. For machined pockets, the gaps will be limited by the thinnest radial walls that may be machined without material deformation during machining. For pocket walls that are molded or formed around the magnets, as in FIG. 14, the radial wall thickness may be very thin and is limited by the tolerance of the magnets. The magnets may not be manufactured exactly and must have manufacturing tolerance on them. The magnets will be specified with a plus zero, minus tolerance so that if all the magnets were at maximum allowable tolerance there would be almost no gap and the radial walls will be vanishingly thin. However, the magnets statistically will be within the size tolerance band and the undersize tolerance amount will contribute to the thickness of the radial walls between the magnets.

In another embodiment, the magnets may also be assembled into magnetic sub-unit groups of two, three, four, or six magnets directly bonded together with a reduced number of pockets in the rotor structure. The pockets with radial walls and gaps between magnet material are then only located at the boundary between each magnetic sub-unit grouping instead of at each magnet boundary. This still provides for circumferential strain relief in the magnets, while simplifying the assembly and manufacturing process. FIG. 16c illustrates this embodiment with the magnetic sub-unit group labelled 901dab.

For a high pole count motor or for a Halbach array with many magnets per electrical cycle, the angles on the trapezoidal sides of the magnet become very close to 90 degrees. In this case, rectangular magnets may be used to assemble the array instead of trapezoidal magnets with only a minimal loss of magnetic field strength in the air gap as the OD and ID of the magnet array approximates closely a circle and less useful magnet volume is wasted. The ribs or webs between the magnets are still narrow toward the ID of the array and cause stress concentrations.

Alternative embodiments of this invention are also possible where manufacturing of the pockets is accomplished using a 3D process where the radial outer wall, side walls, and the surface walls are all manufactured as one piece with the inner radial side open. This would allow rectangular magnets to be inserted from the center of the rotor into a pocket surrounding the magnet on five sides. No figure is provided for this embodiment.

Another embodiment has radial wall dimensions optimized for structural strength and minimum weight. In this case, the areal cross section of the radial walls is nearly constant along the radial length of the radial wall. This same embodiment, or another embodiment, has radial wall dimensions that are optimized for both magnetic and strength properties. In this case the axial dimension of the radial wall is larger than circumferential dimension (thickness) of the wall.

The above-described embodiments are intended to be examples only. Alterations, modifications and variations can be effected to the particular embodiments by those of skill in the art without departing from the scope, which is defined solely by the claims appended hereto.

We claim:

1. An axial flux brushless permanent magnet electrical machine comprising:
   a stator; and
   at least one rotor, the rotor including
      a Halbach array of magnets consisting of at least four magnets per magnetic cycle,
      the magnets in the rotor are contained within pockets in the rotor,
      the pockets are formed
         partly by an outer predominantly circumferential wall that retains the magnets against centrifugal load and
         partly by radial walls between adjacent magnets or magnetic sub-unit groups in the Halbach array,
      the radial walls join with hub structure of the rotor on an inner end thereof and with the circumferential wall on an outer end thereof, and
      where the pockets include an active surface wall perpendicular to the machine axis that is between the magnet and an active air gap of the electrical machine.

2. An axial flux brushless permanent magnet electrical machine comprising:
   a stator; and
   at least one rotor, the rotor including
      a Halbach array of magnets consisting of at least four magnets per magnetic cycle,
      the magnets in the rotor are contained within pockets in the rotor,
      the pockets are formed
         partly by an outer predominantly circumferential wall that retains the magnets against centrifugal load and
         partly by radial walls between adjacent magnets or magnetic sub-unit groups in the Halbach array,
      the radial walls join with hub structure of the rotor on an inner end thereof and with the circumferential wall on an outer end thereof, and
      where the pockets include an inactive surface wall perpendicular to the machine axis that is behind the magnets on an active side of the Halbach array away from a machine air gap.

3. An axial flux brushless permanent magnet electrical machine comprising:

a stator; and
at least one rotor, the rotor including
   a Halbach array of magnets consisting of at least four magnets per magnetic cycle,
   the magnets in the rotor are contained within pockets in the rotor,
   the pockets are formed
      partly by an outer predominantly circumferential wall that retains the magnets against centrifugal load and
      partly by radial walls between adjacent magnets or magnetic sub-unit groups in the Halbach array,
   the radial walls join with hub structure of the rotor on an inner end thereof and with the circumferential wall on an outer end thereof, and
   where the pockets have both active and inactive surface walls perpendicular to the machine axis that cover the magnets on both an active air gap side of the Halbach array and on an active side of the Halbach array away from a machine air gap.

4. An axial flux brushless permanent magnet electrical machine comprising:
a stator; and
at least one rotor, the rotor including
   a Halbach array of magnets consisting of at least four magnets per magnetic cycle,
   the magnets in the rotor are contained within pockets in the rotor,
   the pockets are formed
      partly by an outer predominantly circumferential wall that retains the magnets against centrifugal load and
      partly by radial walls between adjacent magnets or magnetic sub-unit groups in the Halbach array,
   the radial walls join with hub structure of the rotor on an inner end thereof and with the circumferential wall on an outer end thereof, and
having at least one intermediate pocket surface wall.

5. An axial flux brushless permanent magnet electrical machine comprising:
a stator; and
at least one rotor, the rotor including
   a Halbach array of magnets consisting of at least four magnets per magnetic cycle,
   the magnets in the rotor are contained within pockets in the rotor,
   the pockets are formed
      partly by an outer predominantly circumferential wall that retains the magnets against centrifugal load and
      partly by radial walls between adjacent magnets or magnetic sub-unit groups in the Halbach array,
   the radial walls join with hub structure of the rotor on an inner end thereof and with the circumferential wall on an outer end thereof, and
having some magnetic material removed near an inactive surface.

\* \* \* \* \*